Feb. 28, 1967 J. FISHER 3,306,412
DRIVE MECHANISM
Filed Aug. 24, 1964
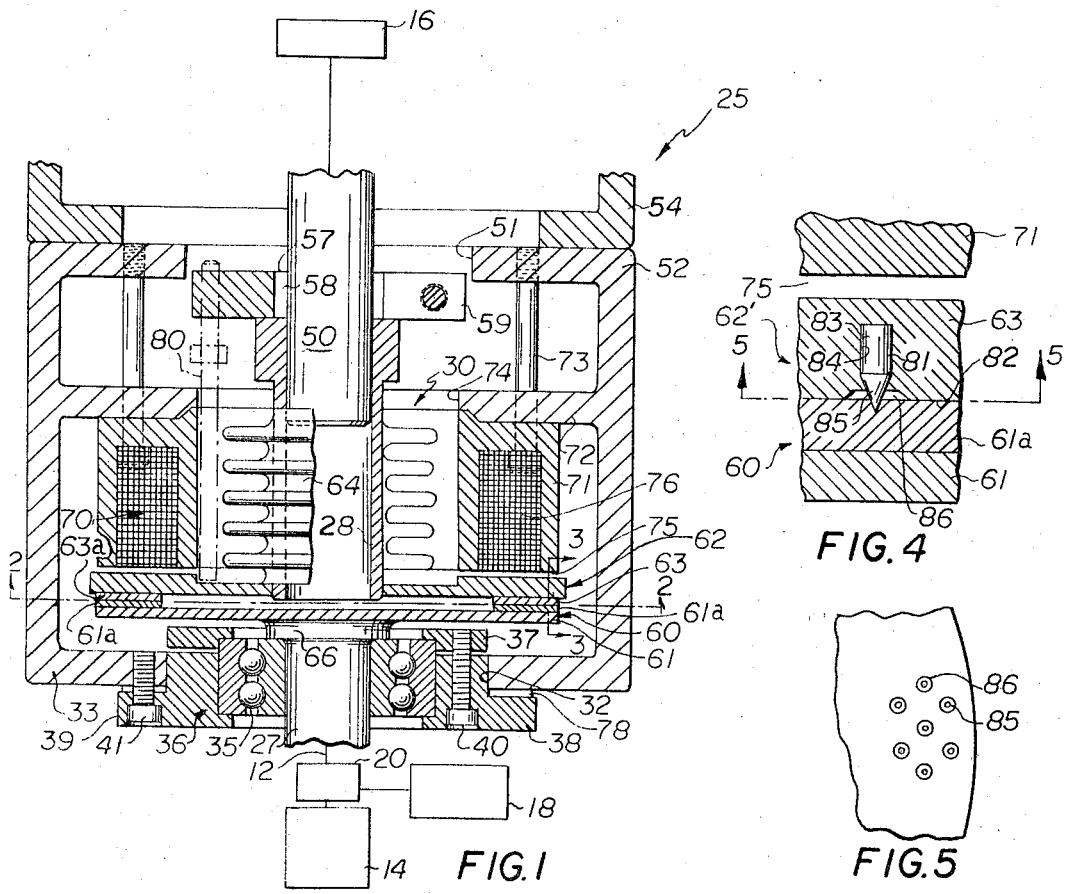
FIG. 1
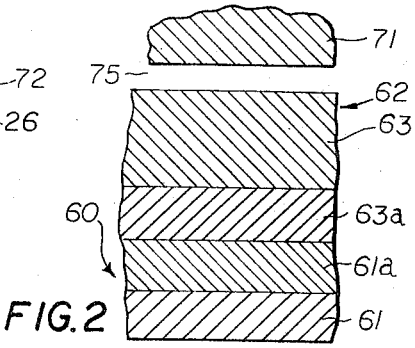
FIG. 4
FIG. 5
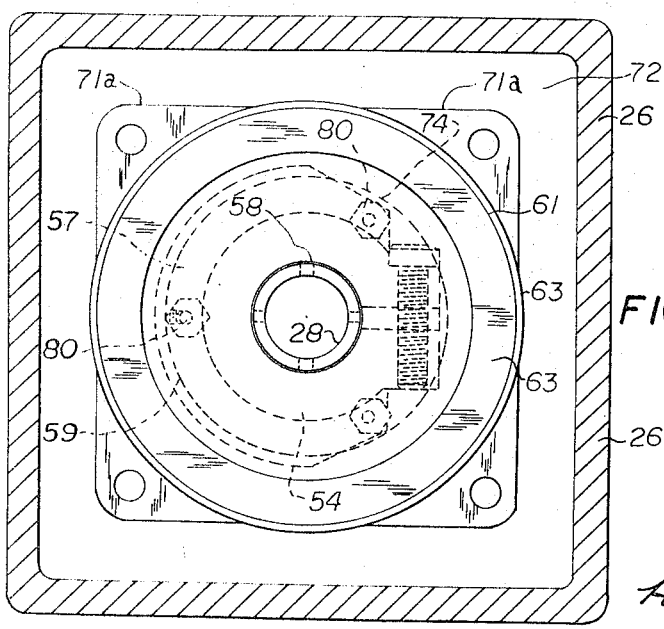
FIG. 2
FIG. 3
INVENTOR.
JOHN FISHER
BY Williams, David,
Hoffmann & Yount
ATTORNEYS United States Patent Office 3,306,412
Patented Feb. 28, 1967

3,306,412
DRIVE MECHANISM
John Fisher, Aurora, Ohio, assignor to The Warner & Swasey Company, Cleveland, Ohio, a corporation of Ohio
Filed Aug. 24, 1964, Ser. No. 391,483
12 Claims. (Cl. 192—138)

The present invention relates to drive mechanisms and more particularly to a drive mechanism for selectively drivingly interconnecting a drive member of a movable machine tool element and a control unit for controlling the position of the movable element.

The principal object of the present invention is the provision of a new and improved drive mechanism for selectively drivingly interconnecting a drive member of a movable machine tool element and an input member of a control unit for controlling the position of the element.

Another object of the present invention is the provision of a new and improved drive mechanism, as defined in the preceding object, wherein the driving interconnection is such that no relative rotational movement takes place between the drive member of the movable machine element and the input member of the control unit to thereby enable the control unit to accurately position the machine element and provide for accurate machining operations.

Another object of the present invention is the provision of a new and improved drive mechanism, as defined in the preceding objects, wherein the drive member and the input member of the control unit can be selectively positioned angularly with respect to each other when disconnected and drivingly interconnected to each other regardless of the angular position preselected.

Yet another object of the present invention is the provision of a machine tool having a new and improved drive mechanism for selectively drivingly interconnecting a drive member of a movable machine tool element thereof and a control unit for controlling the position of the element, and wherein the driving interconnection is such that no relative rotational movement takes place between the drive member and the input member of the control unit to thereby enable the control unit to accurately position the machine element and provide for accurate machining operations.

It is a further object of the present invention to provide a new and improved drive mechanism having an input and an output member and a coupling means which is adapted to selectively drivingly interconnect said members such that no relative rotational movement between the input and output members takes place.

A more specific object of the present invention is to provide a new and improved drive mechanism having an input member, an output member and a coupling means which includes a first clutch plate connected with the input member, a second clutch plate, and an axially expansible but circumferentially rigid bellows member having one end connected to the second clutch plate and the other end connected with the output member for biasing the second clutch plate into engagement with said first clutch plate and whereby the torque from the input member to the output member is transmitted solely through the bellows member.

Yet another object of the present invention is to provide a new and improved drive mechanism, as defined in the preceding object, wherein one of the clutch plates has a plurality of pointed projections extending transversely of its engaging surface which embed within the engaging surface of the other clutch member to provide a positive non-slip drive therebetween.

Other objects, novel characteristics and advantages of this invention will be apparent in the following detailed description and in the accompanying drawings forming a part of this specification and in which:

FIG. 1 is a horizontal sectional view of the preferred embodiment of drive mechanism of the present invention taken approximately through the center line thereof with parts thereof shown in elevation and its use with a machine tool apparatus, shown schematically;

FIG. 2 is a sectional view taken along line 2—2 of FIG. 1;

FIG. 3 is an enlarged fragmentary sectional view taken along line 3—3 of FIG. 1;

FIG. 4 is a fragmentary sectional view similar to that of FIG. 3 but showing a modified construction; and FIG. 5 is a fragmentary sectional view taken along line 5—5 of FIG. 4.

Although the drive mechanism of the present invention is susceptible of use in or in conjunction with various types of apparatus or mechanisms, it is particularly useful in machine tools for selectively drivingly interconnecting a drive member of a machine tool element and a settable control unit for controlling the position of the machine tool element, and for the purposes of illustration, is herein shown, in a schematic manner, drivingly interconnecting a lead screw 12 of a linearly movable work supporting table 14 of a machine tool and a settable control unit 16 for controlling the position of the table.

The table 14, shown schematically in FIG. 1, is adapted to be supported for horizontal linear movement by upstanding ways on a bed of a conventional machine tool, not shown. Linear movement of the table 14 over the ways is produced by rotation of the lead screw which is rotatably supported within the bed of the machine and threadably secured to a nut fixed to the underside of the table. The lead screw is adapted to be rotated by a conventional drive motor 18 operatively connected therewith through a conventional gear reduction unit 20.

One end of the lead screw 12 is adapted to be selectively drivingly connected to the settable position control unit 16 by the drive or clutch mechanism, indicated generally by reference character 25, preferably contained within a suitable housing 26 bolted or otherwise secured to the bed of the machine.

In machine tool applications wherein the machining operations are to be automatically controlled, it is necessary to be able to accurately move a machine tool element between a zero-set or starting position and a final position. One method which has been developed is to employ a pre-set or settable type control unit which is drivingly connected with a drive member of a machine tool element, such as the lead screw 12 for the table 14 as shown in FIG. 1, and operable to decelerate and stop the drive means of the lead screw 12 when the table reaches its final predetermined position.

The control unit 16 may be of any conventional type commercially available or be of the type disclosed in U.S. Patent No. 3,190,153 to Diener et al., and since it does not per se form a part of the present invention, it will not be described in detail. Suffice it for present purposes to say that the control unit may comprise coaxially disposed members each having a contact element, one of which members is adapted to be connected with the lead screw 12 and the other of which is adapted to be rotated via a suitable means to angularly position the contact element thereof with respect to the contact element of the former. Thereafter, when the lead screw 12 is rotated, the angular movement of the contact element of the member connected therewith between its initial position unit until it contacts the contact element of the other member will be proportional to the linear distance moved by the table 14. When the contacts are engaged with one another, a circuit will be energized for the purpose of decelerating and stopping the drive to the lead screw 12 and thus, stopping the table in its predetermined final position.

In setting up a new machining operation under the method referred to, it is necessary to disconnect the driving connection between the lead screw 12 and the control unit 16, zero set the table 14 by rotating the lead screw, pre-set the control unit 16 and reconnect the driving connection between the lead screw and control unit. Since it is desirable and advantageous to be able to rapidly zero set the table 14 and pre-set the control unit 16, a drive or clutch mechanism for selectively drivingly interconnecting the lead screw 12 and control unit 16 is usually provided. While various types of drive or clutch mechanisms have heretofore been employed, they have not proved satisfactory because they did not accurately transmit the rotative movement of the lead screw to the control unit 16 and therefore, the table 14 was not moved to the desired predetermined final position in the machining operation. It has been found that even the use of a clutch mechanism of the type having a spring biased movable clutch plate slidably keyed to a shaft connected with the control unit and engageable with another clutch plate fixed to a shaft connected with the lead screw did not accurately transmit the full rotative movement of the lead screw 12 to the control unit 16 because the slight clearance necessary between the key and the shaft and/or the clutch plate in order to accommodate the sliding movement therebetween allowed a slight amount of relative rotational movement to take place between the spring biased clutch plate and the shaft connected with the control unit 16.

The drive or clutch mechanism 25 of the present invention not only enables the driving connection between the lead screw 12 and control unit 16 to be readily disconnected and reconnected, but also provides a driving connection therebetween which will accurately transmit the rotative movement of the lead screw 12 to the control unit 16 so that the table 14 will be moved to the desired predetermined final position.

Referring to the drawings, the drive or clutch mechanism 25 comprises in general an input or driving member 27 rigidly connected with or rigidly coupled to one end of the lead screw 12, an output or driven member 28 clampingly connected with or coupled to the settable control unit 16 and a coupling means 30 for drivingly interconnecting the input and output members.

The input member 27, in the preferred embodiment, is a shaft and serves as the driving member for the drive or clutch mechanism 25. The input member 27 extends through an opening 32 within an end wall 33 of the housing 26 and is rotatably supported within a suitable annular bearing means 35 and in a manner which prevents relative axial movement therebetween. The bearing means in turn is retained and supported within an annular retainer means 36 extending within the opening 32 and comprising a pair of axially spaced annular members 37, 38 which engage the opposite ends of the annular bearing means 35 and are clamped toward each other by bolts 40 threadably secured within aligned threaded openings in the members 37, 38. The member 38 is provided with an annular flange 39 and detachably secured to the end wall 33 by bolts 41 extending through apertures within the flange 39 and threadably secured within aligned threaded openings within the end wall 33. The retainer means serves to retain the bearing means 35 and prevent axial movement thereof relative to the housing 26.

The output or driven member 28, in the preferred embodiment, is an annular sleeve or member which is clampingly connected to one end of a shaft 50 forming a part of the settable control unit 16 and projecting through an enlarged opening 51 contained within the other or opposite end wall 52 of the housing 26. The other end of the shaft 50 is connected to the control unit 16 supported within a housing 54, which housing is preferably located adjacent the end wall 52 and bolted or otherwise secured thereto. Alternately, if desired, a longer sleeve 28 could be provided and rotatably supported by the end wall 52 in the same manner as the shaft 27 is rotatably supported by the end wall 33.

For the purpose of clampingly connecting the sleeve 28 to the shaft 50, the sleeve 28 is provided at its outer end 57 with four circumferentially spaced axially extending slits or slots 58, which slits enable the end to be circumferentially expanded and contracted. The end 57 is tightly clamped to the shaft by a conventional split clamp member or ring 59 extending therearound.

The coupling means 30 comprises a first annular clutch plate 60 comprising a rigid disk member 61 fixed or otherwise secured to the inner end of the input member 27, i.e., the end located within the housing 26. The coupling means 30 further comprises a second annular clutch plate 62 comprising a rigid disk member 63 concentric with the inner end of the sleeve member 28 and axially slidable thereon. Preferably secured to the inner ends of the disk members 60 and 63 are annular friction shoes 61a and 63a, respectively, made from any suitable material, preferably cork. The disk member 63 is rigidly secured to one end of an elongated metallic bellows spring member 64. The other end of the bellows member 64 is rigidly secured to an intermediate portion of the sleeve 28. The bellows member 64 is axially expansible and contractible and has a normal length when free of any axially imposed forces which is greater than the length of the axial distance between the friction shoe 61a and its outer end connection with the sleeve 28. It is thus apparent that the bellows member upon assembly of the coupling means 30 will be under compression and bias or urge the second clutch plate 62, i.e., the disk member 63 and the annular friction shoe 63a secured thereto, into tight engagement with the annular friction shoe 61a. Moreover, when the annular friction shoe 63a is in engagement with the annular friction shoe 61a, the driving connection and transmission of torque between the input and output members 27 and 28, respectively, will be solely through the bellows member 64.

It has been found that a bellows member, such as the metallic bellows member 64 illustrated, is circumferentially rigid for the forces involved in the type of application described, that is, it will not twist about its axis nor will any relative circumferential or rotational movement take place between its ends when the clutch plates 60, 62 are drivingly engaged and the input member 27 driven.

It should be pointed out that both the clutch plate member 60 and the sleeve 28 are held in a fixed axial position. As viewed in FIG. 1, the clutch plate 60 is fixed to the input member 27 and inward and outward movement of the input member 27 is prevented by the bearing means 35, which supports the member 27 for rotation and is bonded or press-fitted on the shaft 27. Alternatively, thrust bearings may be employed to prevent inward movement and the clutch plate 60 provided with a hub 66 in abutting relationship with the inner end of the bearing means 35 to prevent outward movement, if desired. Outward and inward movement of the sleeve 28 is prevented by the control unit 16. Alternately any suitable means, such as bearings of the conventional canted roller type, may be provided for the purpose of preventing inward and outward movement of the sleeve 28.

To enable the clutch plates 60, 62 to be disengaged from one another, an annular electro-magnet means 70 concentrically disposed around the bellows member 64 is provided. The electro-magnet means includes an annular U-shaped housing and core 71 having a plurality of transverse flanges 71a. The housing 71 is connected to a transversely extending wall member 72 of the housing 26 by bolts 73 extending through aligned apertures in the flanges of the U-shaped housing and the transverse wall member 72 and threadably secured within aligned threaded openings contained in the end wall 52. The member 72 has a large central aperture 74 through which the sleeve 28 projects. The open end of the housing 71 faces toward the clutch plate member 62 and is slightly axially spaced therefrom to form an air gap 75 when the friction shoe 63a of the clutch plate member 62 is in engagement with the friction shoe 61a. The electro-magnet means 70 further includes a coil 76 contained within the housing 71 which is adapted to be selectively energized, in a conventional manner, and when energized draws and moves the clutch plate member or armature 62 out of engagement with the friction shoe 61a of the clutch plate 60 toward the open end of the U-shaped housing 71 and into engagement therewith, the adjacent end of the housing forming an abutment means. When the electro-magnet means 70 is energized and the clutch plate member 62 held in engagement with the housing 71, a braking action will be effected with respect to the output member of sleeve 28, since the bellows member 64 is circumferentially rigid and prevents any relative circumferential movement to take place between the sleeve 28 and the clutch plate member 62.

If a braking action with respect to the output member 28 is not desired upon disengaging the plate member 62 from the clutch plate member 60 by energization of the electro-magnet means 70, a stop means in the form of elongated rod or rods 80 having one end threadably secured to the clamp member 59 and extending through the aperture 74 and between the annular bellows member 64 and the annular housing 71 to a position adjacent the disk member 63 of the clutch plate 62, as shown in phantom lines in FIG. 1, may be provided to limit the movement of the clutch plate member 62 toward the housing 71 and thus, prevent any engagement therebetween.

To enable the air gap 75 to be varied, provision is made for changing the fixed axial position of the clutch plate member 60 relative to the housing 71 which in turn will change the axial position of the clutch plate member 62 relative to the housing 71, since it is urged into engagement with the clutch plate member 60 by the bellows member 64. The provision comprises shims 78 located between the flange 39 and the end wall 33. By varying the thickness of the shims 78, the position of the inner end of the bearing means 35 and hence the disk 60 which is rigidly secured to the input member 27 relative to the housing 71 can be adjusted or varied. It will of course be understood that when the air gap 75 is adjusted or changed, a similar adjustment must be made in the rigid connection between the input member 27 and the lead screw 12.

It has been found that for the forces and torques involved in the type of application described, the friction shoes 61a and 63a, especially if made from a cork material, when held in engagement by the force of the bellows member 64 will provide a driving connection such that no slipping or sliding movement therebetween will take place.

FIG. 4 illustrates an alternate or modified form of clutch plate member 62' which may be employed in place of the clutch plate member 62 for providing a driving connection with the clutch plate member 60 such that no slipping or sliding movement between the clutch plate members will take place. The clutch plate member 62' is similar to the clutch plate member 62 except that a plurality of pins 81 are provided which project transversely from the inner side or engaging face 82 of the disk member 63 and embed within the material of the friction shoe 61a are employed in place of the friction shoe 63a. Each of the pins 81 comprises a cylindrical portion 83 which is press fitted within a complementary shaped recess 84 formed within the disk 63 and a frusto-conical portion 85 having a pointed end which projects a short distance transversely of the engaging face 82. Surrounding the projecting portion of each of the pins 81 the disk 63 has formed therein a circular depression 86. The depressions 86 provide a space into which the material of the friction shoe 61a which is displaced by the end of the frusto-conical portion 85 of the pin 81 can move when the clutch plate member 62 and the friction shoe 61a are in tight engagement. While any number of pins may be employed, preferably seven pins closely bunched together, as shown in FIG. 5, at three annularly equally spaced apart locations on the disk member 63 are provided.

Although the drive mechanism of this invention has been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. In a drive mechanism, a driving member having an annular first member rotatable therewith, a driven member, an axially expansible and contractible but circumferentially rigid biasing and torque transmitting member having one end rigidly connected to said driven member and the other end rigidly connected to an annular second member, said second member being movable between a first position in which it engages said first member to drivingly connect said driving and driven members with the torque being transmitted from said second member to said driven member solely by said biasing member and a second position in which it is disengaged from said first member to disconnect the driving connection therebetween, said biasing member biasing said second member into one of said positions and preventing relative rotational movement between said second member and said driven member, and means for moving said second member against the bias force of said biasing member to said other position.

2. A drive mechanism for drivingly interconnecting a drive member of a movable machine tool element or the like and a settable control means for controlling the position of said machine tool element comprising an input member connected with said drive member, an output member connected with said settable control means, a coupling means for selectively drivingly interconnecting said input and output members, said coupling means including a first annular clutch member rigidly connected to one of said members, a second annular clutch member relatively movable axially of the other member and between a first position in which it engages said first annular member to drivingly connect said annular members and a second position in which it is disengaged from said first annular member to disconnect the driving connection therebetween, a circumferentially rigid, biasing and torque transmitting, member having one end rigidly connected to said other member and the other end rigidly connected to said second clutch member for moving said second clutch member axially of said other member into one of said positions, said biasing member transmitting the torque from said second clutch member to said other member when said second clutch member is in said first position and preventing relative rotational movement to take place between said second clutch member and said output member, and means to move said second member against the bias force of said biasing member to said other position.

3. A drive mechanism for drivingly interconnecting a drive member of a movable machine tool element or the like and a settable control means for controlling the position of said machine tool element comprising an input member connected with said drive member, an output member connected with said settable control means, a coupling means for selectively drivingly interconnecting said input and output members, said coupling means including a first annular clutch plate rigidly connected to said input member, a second annular clutch plate relatively movable axially of the output member and between a first position in which it engages said first annular plate to drivingly connect said annular clutch plates and a second position in which it is disengaged from said first annular plate to disconnect the driving connection therebetween, a torque transmitting, bellows member having one end rigidly connected to said output member and the other end rigidly connected to said second clutch plate for moving and biasing, said second clutch plate axially of said other member into one of said positions and for providing the sole means for transmitting the torque from said second clutch plate to said output member when said second clutch plate is in said first position, said bellows member being circumferentially rigid and thereby preventing relative rotational movement to take place between said second clutch plate and said output member, and means to move said second clutch plate against the bias force of said bellows member to the other of said positions.

4. A drive mechanism for drivingly interconnecting a drive member of a movable machine tool element or the like and a settable control means for controlling the position of said machine tool element comprising an input member rigidly connected with said drive member, an output member clampingly connected with an input member of the settable control means, a coupling means for selectively drivingly interconnecting said input and output members, said coupling means including a first annular clutch plate rigidly connected to said input member, a second annular clutch plate relatively movable axially of the output member and between a first position in which it engages said first annular plate to drivingly connect said annular clutch plates and a second position in which it is disengaged from said first annular plate to disconnect the driving connection therebetween, an axially expansible and contractible but circumferentially rigid torque transmitting, bellows member having one end rigidly connected to said output member and the other end rigidly connected to said second clutch plate for moving said second clutch plate axially of said other member into said first position, said bellows member preventing relative rotational movement to take place between said second clutch plate and said output member and solely transmitting the torque from said second clutch plate to said output member when the former is in said first position, and means to move said second clutch plate against the bias force of said bellows member to said second position.

5. In a drive mechanism, a driving member, a driven member, coupling means for selectively drivingly interconnecting said driving and driven members, said coupling means including a first clutch plate connected to one of said members, a second clutch plate relatively movable toward and away from said first clutch plate between a first position in which it engages said first clutch plate to drivingly connect said members and a second position in which it is disengaged from said first clutch plate to disconnect the driving connection therebetween, an axially expansible and contractible but circumferentially rigid biasing member having one end connected to said other member and the other end connected to said second clutch plate and biasing said second clutch plate into engagement with said first clutch plate, said circumferentially rigid biasing means preventing relative rotational movement between said second clutch plate and said other member, one of said clutch plates containing a plurality of pins extending transversely thereof and which embed within the other clutch plate during engagement therewith when said second clutch plate is moved to said first position to provide a non-slip driving connection between said clutch plates, and means to move said second clutch plate against the bias force of said biasing member to said second position.

6. In a drive mechanism, as defined in claim 5, and wherein said other clutch plate has an annular friction shoe and wherein said one clutch plate has recessed portions around said pins for receiving material displaced from said friction shoe by said pins when said pins embed therein.

7. In a drive mechanism, a driving member, a driven member, coupling means for selectively drivingly interconnecting said driving and driven members, said coupling means including a first clutch plate connected to one of said members, a second clutch plate relatively movable toward and away from said first clutch plate between a first position in which it engages said first clutch plate to drivingly connect said members and a second position in which it is disengaged from said first clutch plate to disconnect the driving connection therebetween, an axially expansible and contractible but circumferentially rigid bellows member having one end connected to said other member and the other end connected to said second clutch plate for moving and biasing said second clutch plate into engagement with said first clutch plate, said circumferentially rigid bellows member preventing relative rotational movement between said second clutch plate and said other member, and means comprising a selectively energizable electro-magnet means surrounding said bellows member for moving said second clutch plate against the bias force of said bellows member to said second position.

8. In a drive mechanism, a driving member, a driven member, coupling means for selectively drivingly interconnecting said driving and driven members, said coupling means including a first clutch plate connected to one of said members, a second clutch plate relatively movable toward and away from first clutch plate between a first position in which it engages said first clutch plate to drivingly connect said members and a second position in which it is disengaged from said first clutch plate to disconnect the driving connection therebetween, an axially expansible and contractible but circumferentially rigid bellows member having one end connected to said other member and the other end connected to said second clutch plate for moving and biasing said second clutch plate into engagement with said first clutch plate, said circumferentially rigid bellows member preventing relative rotational movement between said second clutch plate and said other member, and means comprising a selectively energizable electro-magnet means surrounding said bellows member to move said second clutch plate against the bias force of said biasing member to said second position, said electro-magnet means having an abutment means and when energized drawing and moving said second clutch plate toward and into tight engagement with said abutment means to prevent further rotation of the second clutch plate.

9. In a drive mechanism, a driving member, a driven member, coupling means for selectively drivingly interconnecting said driving and driven members, said coupling means including a first clutch plate connected to one of said members, a second clutch plate relatively movable toward and away from said first clutch plate between the first position in which it engages said first clutch plate to drivingly connect said members and a second position in which it is disengaged from said first clutch plate to disconnect the driving connection therebetween, an axially expansible and contractible but circumferentially rigid bellows member having one end connected to said other member and the other end connected to said second clutch plate for moving and biasing said second clutch plate into engagement with said first clutch plate, said circumferentially rigid bellows member preventing relative rotational movement between second clutch plate and said other member, and means comprising a selectively energizable electro-magnet means surrounding said bellows member to move said second clutch plate against the bias force of said biasing member to said second position, said electro-magnet means when energized drawing and moving said second clutch plate to said second position, and a stop means to limit the movement of said second clutch plate toward said electro-magnet means.

10. In a drive mechanism, a driving member, a driven member, coupling means for selectively drivingly interconnecting said driving and driven members, said coupling means including a first clutch plate connected to one of said members, a second clutch plate relatively movable toward and away from said first clutch plate between a first position in which it engages said first clutch plate to drivingly connect said members and a second position in which it is disengaged from said first clutch plate to disengage the driving connection therebetween, an axially expansible and contractible but circumferentially rigid biasing and torque transmitting member having one end connected to said other member and the other end connected to said second clutch plate for biasing said second clutch plate into engagement with said first clutch plate and for solely transmitting the torque between said second clutch plate and said other member when said second clutch plate is in said first position, said circumferentially rigid biasing member preventing relative rotational movement between said second clutch plate and said other member, and means to move said second clutch plate against the bias force of said biasing member toward said second position.

11. In a drive mechanism, as defined in claim 10, wherein the means for moving said second clutch plate against the bias force of said biasing member comprises a selectively energizable electro-magnet means.

12. In a drive mechanism, as defined in claim 10, and wherein said biasing member is a bellows member having one end connected to the driven member and the other end rigidly connected to said second clutch plate.

References Cited by the Examiner

UNITED STATES PATENTS

| | | | |
|---|---|---|---|
| 168,845 | 10/1875 | Pratt | 267—63 |
| 1,020,778 | 3/1912 | Prange | 192—107 X |
| 2,090,401 | 8/1937 | Mayo. | |
| 2,163,033 | 6/1939 | Gosling et al. | 192—88 |
| 2,275,204 | 3/1942 | Smirl | 192—88 |
| 2,408,327 | 9/1946 | McLean | 192—88 |
| 2,960,190 | 11/1960 | Holper | 192—107 X |
| 2,992,715 | 7/1961 | Blachly | 192—108 X |
| 3,160,128 | 12/1964 | Heidt. | |
| 3,198,302 | 8/1965 | Janzen. | |

DAVID J. WILLIAMOWSKY, *Primary Examiner.*

A. McKEON, *Assistant Examiner.*